: 3,156,744
Patented Nov. 10, 1964

3,156,744
HIGH IMPACT STRENGTH BLENDS OF VINYL-CHLORIDE RESINS WITH ETHYLENE-CARBON MONOXIDE COPOLYMERS
Dennis H. Mullins, St. Albans, W. Va., assignor to Union Carbide Corporation, a corporation of New York
No Drawing. Filed Sept. 9, 1960, Ser. No. 54,860
7 Claims. (Cl. 260—897)

The present invention relates to homogeneous vinyl chloride resin compositions having improved physical properties and processing characteristics. More particularly, the present invention is concerned with novel polymer blends containing a vinyl chloride resin together with a minor proportion of a copolymer of ethylene with carbon monoxide. The invention is concerned further with the improved rigid, opaque plastic alloys produced from, and comprised of the aforementioned polymer blends.

Vinyl chloride resins are, in general, rigid polymeric compositions characterized by a high degree of resistance to chemical attack, and consequently have come into extensive use in the chemical processing industries as well as in other manufacturing applications. Vinyl chloride resins are, for example, widely used as molding, piping, sheeting and the like. Unfortunately, however, unplasticized or slightly plasticized vinyl chloride resins usually prove quite brittle. Hence, for practical purposes, many uses which require a resin possessing a relatively high impact strength are precluded in the case of vinyl chloride resins.

Heretofore, attempts to improve the physical properties and processing characteristics, and particularly the impact strength of vinyl chloride resins by the incorporation of substantial quantities of plasticizers, butadiene rubbers or similar compounding ingredients have frequently proven unsatisfactory in that any improvement obtained in such a manner has oftentimes been accompanied by an undue sacrifice of other desirable physical properties, such as the heat-distortion temperature of the resins, the chemical resistance of the resins, etc. For this reason among others, the development of improved vinyl chloride resin compositions has continued to receive attention from those skilled in the art.

It has now been found that the impact strength of vinyl chloride resin compositions can be enhanced appreciably without disadvantage to other of their desirable physical properties by blending the vinyl chloride resins with minor quantities of solid ethylene-carbon monoxide copolymers as hereinafter described. In many instances, the polymer blends of this invention have also been found to be more resistant to discoloration as well as being more easy to process than the corresponding vinyl chloride resins of which they are in part composed. The improvement in processibility is evidenced, for example, by the fact that the polymer blends of this invention permit a more fluid operation and provide a smoother milled mass, i.e. sheeting, film, etc., than that encountered in connection with the processing of the unblended vinyl chloride resin. Moreover, the rigid, opaque plastic alloys produced from, and comprised of the polymer blends of this invention can be used in virtually all of the applications where rigid vinyl chloride resins have heretofore been employed, and in any given formulation will ordinarily exhibit properties equal or superior in many respects to those of the corresponding vinyl chloride resins of which they are in part composed. In particular, the plastic alloys of this invention are especially well suited for use in applications where improved impact strength at little or no significant reduction in heat distortion temperature is desired, such as in piping, scuff panels, structural materials in general, and the like.

The vinyl chloride resins contemplated by this invention include homopolymers of vinyl chloride as well as copolymers thereof with minor proportions of other ethylenically unsaturated compounds. Preferably, the vinyl chloride resin employed is a homopolymer of vinyl chloride, i.e., poly(vinyl chloride), since the most rigid compositions are ultimately obtainable therefrom. However, the vinyl chloride resin can also contain up to about 20 percent by weight of other ethylenically unsaturated compounds copolymerizable with vinyl chloride; conversely stated, the resin should contain at least about 80 percent by weight of vinyl chloride copolymerized therein. Other ethylenically unsaturated compounds which are suitable in this connection include, by way of illustration, vinyl esters of alkanoic acids such as vinyl acetate, vinyl propionate, vinyl butyrate and the like; alkyl acrylate and methacrylate esters such as ethyl acrylate, methyl methacrylate, propyl acrylate, butyl methacrylate and the like; other vinyl halides such as vinyl bromide, vinyl fluoride and the like; vinylidene halides, such as vinylidene bromide, vinylidene chloride, vinylidene fluorochloride and the like; unsaturated hydrocarbons, such as ethylene, propylene, isobutylene and the like; allyl compounds such as allyl acetate, allyl chloride, allyl ethyl ether and the like, etc. Accordingly, as employed herein, the term "vinyl chloride resin" is meant to include both homopolymers of vinyl chloride and copolymers of vinyl chloride with other ethylenically unsaturated monomers as hereinabove defined.

The vinyl chloride resins suitable for use in this invention can vary over a broad molecular weight range. Preferably, the vinyl chloride resin utilized is one having a molecular weight corresponding to a reduced viscosity in the range of from about 0.5 to about 1.5, whereby optimum conditions, determinable for instance in terms of processing ease, are attained. The advantages accruable in accordance with this invention can, however, also be realized with higher or lower molecular weight vinyl chloride resins so long as the resin is susceptible to conventional milling and molding operations. Such vinyl chloride resins can readily be determined by one skilled in the art in light of the disclosure.

By the term "reduced viscosity," as used herein, is meant a value obtained by dividing the specific viscosity of a vinyl chloride resin solution by the concentration of the resin in the solution, the concentration being calculated in grams of resin per 100 milliliters of solvent at a given temperature. The specific viscosity is obtained by dividing the difference between the viscosity of the resin solution and the viscosity of the solvent by the viscosity of the solvent.

The reduced viscosity is taken to be a measure of the molecular weight of the vinyl chloride resin in that a higher reduced viscosity indicates a higher molecular weight resin, while conversely, a lower reduced viscosity indicates a lower molecular weight resin. In all cases, the reduced viscosity values set forth herein are determined at a temperature of 20° C. using a cyclohexanone solution of the resin containing a concentration of 0.2 gram of resin per 100 milliliters of solvent.

The vinyl chloride resins and the methods of their manufacture are well known to the art. Resins of this nature are, by way of illustration, discussed more fully in the U.S. Patent 2,802,809. Such resins can be produced by conventional bulk, suspension or solution methods of polymerization. Typical polymerization procedures for the production of the vinyl chloride resins are also described, for instance, in Schildknecht, "Vinyl and Related Polymers," John Wiley and Sons, 1952, Chapter VII.

The molecular weight of the ethylene-carbon monoxide copolymers suitable for use in accordance with this invention can also vary over a wide range. Moreover, it has been found that the use of higher molecular weight ethylene-carbon monoxide copolymers, other factors being constant, generally leads to formation of rigid, opaque plastic alloys having higher impact strength. On the other hand, greater processing ease, i.e. ease of dispersion in blends with the vinyl chloride resins, is realized with the lower molecular weight ethylene-carbon monoxide copolymers. However, the ethylene-carbon monoxide copolymer employed should not have a molecular weight so low that an improvement in impact strength is adversely affected. Thus, the ethylene-carbon monoxide copolymer to be employed in accordance with this invention is one which is solid, generally a free flowing powder, having a molecular weight corresponding to a melt index which is ordinarily in the range of from about 0.01 to about 100, preferably in the range of from about 0.03 to about 50, and more preferably in the range of from about 0.1 to about 10. Ethylene-carbon monoxide copolymers having a slightly higher or lower melt index can also be utilized.

The term "melt index" as employed herein is, in all instances, meant to define the value determined in accordance with A.S.T.M. method D1238–52T, and is expressed in units of decigrams per minute at a temperature of 190° C. and under a pressure of 43.1 pounds per square inch. The melt index is taken to be a measure of the molecular weight of the ethylene-carbon monoxide copolymer in that a lower melt index indicates a higher molecular weight copolymer, while conversely, a higher melt index indicates a lower molecular weight copolymer.

In addition to the molecular weight of the ethylene-carbon monoxide copolymer, the concentration or proportion of the carbon monoxide component combined in the copolymer has also been found to have an effect upon the impact strength of the rigid, opaque plastic alloys produced in accordance with this invention. For example, an increase in the carbon monoxide content of the polymer employed ordinarily engenders a corresponding increase in the impact strength of the resulting product, other factors being constant. However, as the carbon monoxide content of the copolymer increases above about 10 percent by weight, and particularly above about 15 percent by weight based upon the weight of the copolymer, a corresponding reduction in the heat-distortion temperature of the product may also be engendered. On the other hand, little improvement in impact strength is generally realized by the use of an ethylene-carbon monoxide copolymer containing appreciably less than about 1 percent by weight of the carbon monoxide component. Thus, while the content of the ethylene-carbon monoxide copolymer utilized in accordance with this invention can vary broadly between about 1 percent by weight or slightly lower, to about 15 percent by weight or slightly higher, the preferred copolymer for use in this invention is one having a combined carbon monoxide content from about 2 percent to about 10 percent by weight, and preferably from about 4 percent to about 8 percent by weight based upon the weight of the copolymer.

The ethylene-carbon monoxide copolymers described herein and the methods of their production are also well known to the art. The copolymers can be obtained, for example, by the reaction of ethylene with carbon monoxide using the procedure disclosed in U.S. Patent 2,495,286, or in any other convenient manner. Particularly good results have been obtained in this respect by carrying out the copolymerization in the presence of a free radical-type catalyst at pressures varying in the range of from about 25,00 pounds per square inch to about 35,000 pounds per square inch and at temperatures varying in the range of from about 180° C. to about 250° C., whereby polymer products differing in molecular weight were prepared.

The blends of vinyl chloride resins with ethylene-carbon monoxide copolymers produced in accordance with this invention contain from about 1 percent to about 30 percent by weight of the copolymer based upon the total weight of the blend, with from about 2 to about 15 percent by weight of the copolymer, being preferred for use with poly(vinyl chloride) resins, and from about 10 to about 30 percent by weight of the copolymer being preferred when the vinyl chloride resin contains a substantial amount of a monomer other than vinyl chloride copolymerized therein. Somewhat higher or lower copolymer concentrations are also satisfactory in this respect. In general, an increase in the ethylene-carbon monoxide copolymer content of the blend, and therefore of the rigid opaque plastic alloys produced therefrom, engenders a corresponding increase in the impact strength of the final product, other factors being constant, until a maximum effect at a copolymer content of from about 5 to about 20 percent by weight is reached. Thereafter, the impact strength gradually decreases and some reduction in the heat-distortion temperature of the product may also be observed. At an ethylene-carbon monoxide copolymer content substantially less than about 1 percent by weight, little if any improvement in impact strength is realized, while the minor improvements in impact strength obtainable at copolymer concentrations appreciably in excess of about 30 percent by weight may be offset by the significant decrease in heat-distortion temperature that is often concomitant therewith.

In the practice of this invention, the vinyl chloride resin and the ethylene-carbon monoxide copolymer can be blended in any convenient manner. A suitable procedure, for instance, involves manually or mechanically admixing the polymers in proportions as hereinabove described in an unheated container, and adding the mixture to an equal-speed two-roll mill maintained at a temperature of from about 125° C. to about 180° C. The mixture fluxes readily at these temperatures to form a smooth sheet which, after about five minutes of milling, can be stripped from the rolls and cooled to yield a homogeneous rigid, opaque plastic alloy sheet evidencing high impact strength. Other methods of mixing and processing are equally effective. For example, the polymer mixture can be added to a hot Banbury mill for fluxing and homogenizing and then fed to a hot roll mill or calender for the sheeting operation. Still other methods of processing will occur to those skilled in the art and can be employed satisfactorily in accordance with this invention.

It is to be noted that minor amounts of conventional heat stabilizers such as those ordinarily used with vinyl chloride resins can be incorporated in the polymer blends of this invention when desired. Illustrative of such stabilizers are: dibutyltin dilaurate, dibutyltin maleate, basic lead carbonate, dibasic lead phosphite, dibasic lead stearate, lead oxide, alkaline earth silicates, hydroquinones, lead phenolate, aromatic compounds containing phenolic and amino groups and the like. Particularly good results have been obtained with dibutyltin dilaurate and dibutyltin maleate. Moreover, while any stabilizing quantity can be employed, the heat stabilizers described above are preferably incorporated in the polymer blends of this invention in a concentration of from about 0.1 percent to about 10 percent by weight based upon the total weight of polymer. A lubricant such as stearic acid, polyethylene or the like can also be incorporated in the polymer blends for the purpose of improving roll release during milling operations. When employed, such additives are generally incorporated in a concentration of from 0.5 percent to about 2 percent by weight based upon the total weight of polymer. In addition, conventional inorganic pigments and fillers such as titanium dioxide, precipitated calcium carbonate and the like can also be incorporated in the polymer blends of this invention when desired without adverse effect upon the improved impact strength of the plastic alloys produced therefrom, and often engender a slight further improvement in the impact strength of such plastic alloys.

The present invention can be illustrated further in connection with the following examples of its practice but is not intended to be limited thereby. In the examples, the indicated percentages of combined carbon monoxide in the ethylene-carbon monoxide copolymers were determined by carbon and hydrogen analysis of the copolymers. The ethylene-carbon monoxide copolymers were initially obtained under those reaction conditions specifically described above in connection with their production.

EXAMPLE I

A series of experiments, designated below as run numbers 1 to 14, were conducted to determine and compare the impact strength and heat-distortion temperature of conventional poly(vinyl chloride) and of rigid, opaque plastic alloys produced from blends of poly(vinyl chloride) with varying proportions of ethylene-carbon monoxide copolymers in which copolymers the proportion of the polymerized carbon monoxide component was also varied. Run number 1, a control experiment, was conducted using unblended poly(vinyl chloride). In run numbers 2 to 5, the ethylene-carbon monoxide copolymer employed in producing the plastic alloys of this invention contained about 2.2 percent by weight of combined carbon monoxide and had a melt index of 0.9; in run numbers 6 to 9, the ethylene-carbon monoxide copolymer contained about 3.3 percent by weight of combined carbon monoxide and had a melt index of 31.0; in run numbers 10 and 11, the ethylene-carbon monoxide copolymer contained about 8.9 percent by weight of combined carbon monoxide and had a melt index of 33.0; in run number 12, the ethylene-carbon monoxide copolymer contained about 11.0 percent by weight of combined carbon monoxide and had a melt index of 2.5; and in run numbers 13 and 14, the ethylene-carbon monoxide copolymer contained about 13.5 percent by weight of combined carbon monoxide and had a melt index of 0.9. The poly(vinyl chloride) employed in this series of experiments had a reduced viscosity of 0.75. In addition, a heat stabilizer, namely dibutyltin dilaurate, was also incorporated in the polymer composition of each experiment in a concentration of 1.5 percent by weight based upon the total weight of polymer.

In each experiment, poly(vinyl chloride) or a mixture of poly(vinyl chloride) and an ethylene-carbon monoxide copolymer was fluxed and homogenized on a laboratory two-roll mill. After about 5 minutes of homogenization, the mill opening was adjusted so as to produce a milled sheet having a thickness of approximately 30 mils, and the resulting sheet removed from the mill. Thereafter, strips were cut from the milled sheet and molded by compression so as to obtain specimens measuring 0.5 inch by 0.5 inch by 5.0 inches for use in heat-distortion temperature and impact strength tests. The heat-distortion temperature of each specimen tested was determined in accordance with A.S.T.M. method D648–45T, measured at a stress of 264 pounds per square inch. The impact strength of each specimen tested was determined in accordance with A.S.T.M. method D256–56, procedure A.

The proportions in which the polymers were employed, the operating conditions utilized and the test results obtained in this series of experiments are tabulated below in Table A. In the table, the polymer proportions employed are indicated in parts by weight, the milling, molding and heat-distortion temperatures are indicated in degrees centigrade, and the impact strength is indicated in foot-pounds.

Table A

| | Run Numbers | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Proportion of: | | | | | | | | | | | | | | |
| Poly(vinyl chloride) | 100 | 97.5 | 95.0 | 90.0 | 85.0 | 97.5 | 95.0 | 92.5 | 90.0 | 95.0 | 90.0 | 90.0 | 97.0 | 85.0 |
| Ethylene-carbon monoxide copolymer | 0 | 2.5 | 5.0 | 10.0 | 15.0 | 2.5 | 5.0 | 7.5 | 10.0 | 5.0 | 10.0 | 10.0 | 3.0 | 5.0 |
| Milling temperature | 165 | 165 | 165 | 165 | 165 | 165 | 165 | 165 | 165 | 165 | 165 | 165 | 165 | 165 |
| Molding temperature | 175 | 175 | 180 | 180 | 175 | 175 | 175 | 175 | 175 | 175 | 175 | 180 | 175 | 180 |
| Impact strength | 0.5 | 0.7 | 0.9 | 1.2 | 0.6 | 0.7 | 1.7 | 1.5 | 0.6 | 0.7 | 2.0 | 0.8 | 0.6 | 0.7 |
| Heat-distortion temperature | 76 | 72 | 70 | 78 | 77 | 74 | 75 | 73 | 75 | 73 | 65 | 67 | 71 | 67 |

EXAMPLE II

The following series of experiments, designated below as run numbers 1 to 7, were conducted in a similar manned and using the same vinyl chloride resin and the same heat-stabilizer described in Example I. The ethylene-carbon monoxide copolymer employed in this series of experiments contained between about 4.4 percent and about 4.9 percent by weight of combined carbon monoxide and had a melt index of 0.1. As in Example I, the heat stabilizer was employed in a concentration of 1.5 percent by weight based upon the total weight of polymer. In addition, stearic acid was also incorporated in the polymer composition of each experiment in a concentration of 1.0 percent by weight based upon the total weight of polymer.

The proportions in which the polymers were employed, the operating conditions utilized and test results obtained in this series of experiments are tabulated in Table B below in a manner similar to that described in connection with Table A.

Table B

| | Run Numbers | | | | | | |
|---|---|---|---|---|---|---|---|
| | 1 | 2 | 3 | 4 | 5 | 6 | 7 |
| Proportion of: | | | | | | | |
| Poly(vinyl chloride) | 100 | 99.0 | 95.0 | 90.0 | 85.0 | 80.0 | 70.0 |
| Ethylene-carbon monoxide copolymer | 0 | 1.0 | 5.0 | 10.0 | 15.0 | 20.0 | 30.0 |
| Milling temperature | 165 | 165 | 165 | 165 | 165 | 165 | 165 |
| Molding temperature | 185 | 185 | 185 | 180 | 180 | 180 | 180 |
| Impact strength | 0.34 | 0.50 | 1.02 | 1.27 | 0.92 | 0.66 | 0.53 |
| Heat-distortion temperature | 70 | 69 | 70 | 71 | 70 | 64 | 53 |

Another series of experiments, designated below as run numbers 8 to 12, were conducted as described above in this example, with the following exceptions. In run numbers 8 to 10, the poly(vinyl chloride) employed had a reduced viscosity of 0.55, while in run numbers 11 and 12, the poly(vinyl chloride) employed had a reduced viscosity of 0.9.

The proportion in which the polymers were employed, the operating conditions utilized, and the test results obtained in this series of experiments are tabulated below in Table C.

Table C

| | Run Numbers | | | | |
|---|---|---|---|---|---|
| | 8 | 9 | 10 | 11 | 12 |
| Proportion of: | | | | | |
| Poly(vinyl chloride) | 100 | 95.0 | 90.0 | 100 | 95.0 |
| Ethylene-carbon monoxide copolymer | 0 | 5.0 | 10.0 | 0 | 5.0 |
| Milling temperature | 165 | 165 | 165 | 165 | 165 |
| Molding temperature | 175 | 180 | 180 | 175 | 180 |
| Impact strength | 0.24 | 0.49 | 0.62 | 0.49 | 1.5 |
| Heat-distortion temperature | 68 | 69 | 70 | 73 | 73 |

EXAMPLE III

The following series of experiments, designated below as run numbers 1 to 6, were conducted in a manner similar to that described in Example I. The vinyl chloride resin employed in this series of experiments was a vinyl chloride-vinyl acetate copolymer containing 14 percent by weight of combined vinyl acetate and had a reduced viscosity of 0.55. The ethylene-carbon monoxide copolymer contained about 4.4 percent by weight of combined carbon monoxide and had a melt index of 0.1. Dibutyltin dilaurate and stearic acid were also incorporated in the polymer composition of each experiment in concentrations of 1.5 percent by weight and 1.0 percent by weight, respectively, based upon the total weight of polymer.

The proportions in which the polymers were employed, the operating conditions utilized, and the test results obtained in this series of experiments are tabulated below in Table D in a manner similar to that described in connection with Table A.

*Table D*

|  | Run Numbers | | | | | |
|---|---|---|---|---|---|---|
|  | 1 | 2 | 3 | 4 | 5 | 6 |
| Proportion of: |  |  |  |  |  |  |
| Vinyl chloride-vinyl acetate copolymer | 100 | 99.0 | 95.0 | 85.0 | 80.0 | 70.0 |
| Ethylene-carbon monoxide copolymer | 0 | 1.0 | 5.0 | 15.0 | 20.0 | 30.0 |
| Milling temperature | 125 | 125 | 125 | 125 | 125 | 125 |
| Molding temperature | 145 | 145 | 145 | 145 | 145 | 145 |
| Impact strength | 0.19 | 0.25 | 0.36 | 0.47 | 0.68 | 0.61 |
| Heat-distortion temperature | 60 | 62 | 61 | 62 | 63 | 59 |

Another series of experiments, designated below as run numbers 7 to 11, were conducted as described above in this example, with the following exceptions. In run number 8, the ethylene-carbon monoxide copolymer employed contained about 2.2 percent by weight of combined carbon monoxide and had a melt index of 0.57; in run number 9, the ethylene-carbon monoxide copolymer contained between about 8.9 percent and about 9.6 percent by weight of combined carbon monoxide and had a melt index of 20; in run number 10, the ethylene-carbon monoxide copolymer contained between about 9 percent and about 11 percent by weight of combined carbon monoxide and had a melt index of 0.9; and in run number 11, the ethylene-carbon monoxide copolymer contained about 13.5 percent by weight of combined carbon monoxide and had a melt index of 0.9.

The proportions in which the polymers were employed, the operating conditions utilized and the test results obtained in this series of experiments are tabulated below in Table E.

*Table E*

|  | Run Numbers | | | | |
|---|---|---|---|---|---|
|  | 7 | 8 | 9 | 10 | 11 |
| Proportion of: |  |  |  |  |  |
| Vinyl chloride-vinyl acetate copolymer | 100 | 90.0 | 85.0 | 80.0 | 90.0 |
| Ethylene-carbon monoxide copolymer | 0 | 10.0 | 15.0 | 20.0 | 10.0 |
| Milling temperature | 125 | 125 | 125 | 125 | 125 |
| Molding temperature | 145 | 145 | 145 | 145 | 145 |
| Impact strength | 0.22 | 0.5 | 0.5 | 0.8 | 0.4 |
| Heat-distortion temperature | 62 | 61 | 62 | 60 | 59 |

EXAMPLE IV

The following series of experiments, designated below as run numbers 1 to 8, were conducted in a similar manner and using the same vinyl chloride resin described in Example I. In run numbers 2 and 3, the ethylene-carbon monoxide copolymer employed in producing the plastic alloys of this invention contained about 2.4 percent by weight of combined carbon monoxide and had a melt index of 0.6, in run numbers 4 to 8, the ethylene-carbon monoxide copolymer employed contained about 11.5 percent by weight of combined carbon monoxide and had a melt index of 31.0. To the polymer composition of each experiment, 2.0 percent by weight of dibasic lead phosphite and 1.0 percent by weight of dibasic lead stearate based upon the total weight of polymer were added as heat stabilizers. In addition, 1.0 percent by weight of stearic acid based upon the total weight of polymer was also added to each of the polymer blends of run numbers 2 to 8.

The proportions in which the polymers were employed, the operating conditions utilized and the test results obtained in this series of experiments are tabulated below in Table F in a manner similar to that described in connection with Table A.

*Table F*

|  | Run Numbers | | | | | | | |
|---|---|---|---|---|---|---|---|---|
|  | 1 | 2 | 3 | 4 | 5 | 6 | 7 | 8 |
| Proportion of: |  |  |  |  |  |  |  |  |
| Poly(vinyl chloride) | 100 | 92.5 | 87.5 | 97.5 | 95.0 | 92.5 | 90.0 | 87.5 |
| Ethylene-carbon monoxide copolymer | 0 | 7.5 | 12.5 | 2.5 | 5.0 | 7.5 | 10.0 | 12.5 |
| Milling temperature | 165 | 180 | 175 | 180 | 180 | 180 | 180 | 180 |
| Molding temperature | 175 | 185 | 180 | 185 | 180 | 180 | 180 | 180 |
| Impact strength | 0.7 | 1.6 | 1.2 | 0.9 | 1.2 | 1.6 | 1.9 | 2.6 |
| Heat-distortion temperature | 75 | 77 | 77 | 77 | 75 | 75 | 72 | 72 |

From the above tables, it can be seen that the impact strength of the plastic alloys of this invention are superior to that of the unblended vinyl chloride resins. It can also be seen that a substantial improvement in impact strength can be achieved in accordance with this invention at little if any sacrifice in the heat-distortion temperature of the products.

What is claimed is:

1. A homogeneous rigid, opaque composition comprising a vinyl chloride resin selected from the group consisting of homopolymers of vinyl chloride and interpolymers of vinyl chloride with at least one other ethylenically unsaturated copolymerizable monomer, said interpolymer containing at least about 80 percent by weight of polymerized vinyl chloride, and, blended therewith, from about 1 percent to about 30 percent by weight based upon the total weight of polymer of a solid ethylene-carbon monoxide copolymer containing from about 1 percent to about 15 percent by weight of the carbon monoxide component and having a melt index of from about 0.01 to about 100 at a temperature of 190° C. and under a pressure of 43.1 pounds per square inch.

2. A homogeneous rigid, opaque composition comprising a vinyl chloride resin selected from the group consisting of homopolymers of vinyl chloride and interpolymers of vinyl chloride with at least one other ethylenically unsaturated copolymerizable monomer, said interpolymer containing at least about 80 percent by weight of polymerized vinyl chloride, and, blended therewith, from about 1 percent to about 30 percent by weight based upon the total weight of polymer of a solid ethylene-carbon monoxide copolymer containing from about 2 percent to about 10 percent by weight of the carbon monoxide component and having a molecular weight corresponding to a melt index of from about 0.03 to about 50 at a temperature of 190° C. and under a pressure of 43.1 pounds per square inch.

3. A homogeneous rigid, opaque composition comprising a vinyl chloride resin and, blended therewith, from about 1 percent to about 30 percent by weight based upon the total weight of polymer of a solid ethylene-carbon monoxide copolymer containing from about 4 percent to about 8 percent by weight of the carbon monoxide component and having a molecular weight corresponding to a melt index of from about 0.1 to about 10 at a temperature of 190° C. and under a pressure of 43.1 pounds per square inch.

4. A homogeneous rigid, opaque composition comprising a poly(vinyl chloride) resin having a molecular weight corresponding to a reduced viscosity of from about 0.5 to about 1.5 and, blended therewith, from about 2 percent to about 15 percent by weight based upon the total weight of polymer of a solid ethylene-carbon monoxide copolymer resin containing from about 2 percent to about 10 percent by weight of the carbon monoxide component and having a melt index of from about 0.03 to about 50 at a temperature of 190° C. and under a pressure of 43.1 pounds per square inch.

5. A homogeneous rigid, opaque composition comprising a poly(vinyl chloride) resin having a molecular weight corresponding to a reduced viscosity of from about 0.5 to about 1.5 and, blended therewith, from about 2 percent to about 15 percent by weight based upon the total weight of polymer of a solid ethylene-carbon monoxide copolymer containing from about 4 percent up to about 8 percent by weight of the carbon monoxide component and having a melt index of from about 0.1 to about 10 at a temperature of 190° C. and under a pressure of 43.1 pounds per square inch.

6. A homogeneous rigid, opaque composition comprising a vinyl chloride-vinyl acetate copolymer resin containing up to about 20 percent by weight of the vinyl acetate component and having a molecular weight corresponding to a reduced viscosity of from about 0.5 to about 1.5 and, blended therewith, from about 10 percent to about 30 percent by weight based upon the total weight of polymer of a solid ethylene-carbon monoxide copolymer containing from about 2 percent to about 15 percent by weight of the carbon monoxide component and having a molecular weight corresponding to a melt index of from about 0.03 to about 50 at a temperature of 190° C. and under a pressure of 43.1 pounds per square inch.

7. A homogeneous rigid, opaque composition comprising a vinyl chloride-vinyl acetate copolymer resin containing up to about 20 percent by weight of the vinyl acetate component and having a molecular weight corresponding to a reduced viscosity of from about 0.5 to about 1.5 and, blended therewith, from about 10 percent to about 30 percent by weight based upon the total weight of polymer of a solid ethylene-carbon monoxide copolymer containing from about 4 percent to about 8 percent by weight of the carbon monoxide component and having a molecular weight corresponding to a melt index of from about 0.1 to about 10 at a temperature of 190° C. and under a pressure of 43.1 pounds per square inch.

References Cited in the file of this patent

UNITED STATES PATENTS

| | | |
|---|---|---|
| 2,495,286 | Brubaker | Jan. 24, 1950 |
| 2,541,987 | Cramer | Feb. 20, 1951 |

FOREIGN PATENTS

| | | |
|---|---|---|
| 571,090 | Canada | Feb. 24, 1959 |
| 1,037,565 | France | Sept. 21, 1953 |

OTHER REFERENCES

Brubaker et al.: American Chem. Soc., vol. 74, pp. 1509–15 (1952).